United States Patent [19]

Begovich

[11] Patent Number: 5,160,368
[45] Date of Patent: Nov. 3, 1992

[54] BIODEGRADABLE PACKAGES FOR FAST FOOD AND METHOD OF PREPARING THE SAME

[76] Inventor: Juan A. Begovich, Progreso 124, Coyoacan, 04010 Mexico, D.F., Mexico

[21] Appl. No.: 851,121

[22] Filed: Mar. 16, 1992

[63] Continuation of Ser. No. 670,558, Mar. 18, 1991, abandoned.

[51] Int. Cl.⁵ ............................................. C08L 89/00
[52] U.S. Cl. ............................ 106/154.1; 106/163.1; 106/158; 426/138; 428/2; 206/524.1
[58] Field of Search ................. 106/154.1, 163.1, 158; 426/138; 428/2; 206/2, 3, 17, 23, 34.1, 571, 576, 583, 588, 594, 906, 524.1; 229/7

[56] References Cited

U.S. PATENT DOCUMENTS

| | | | |
|---|---|---|---|
| 254,964 | 3/1882 | Harass | 106/158 |
| 433,471 | 8/1890 | Johns | 106/158 |
| 4,731,249 | 3/1988 | Findley | 426/138 |

Primary Examiner—Theodore Morris
Assistant Examiner—David M. Brunsman
Attorney, Agent, or Firm—Sughrue, Mion, Zinn Macpeak & Seas

[57] ABSTRACT

A biodegradable package for fast food comprises a heat-molded body of a moldable composition which consists essentially of an admixture of fully biodegradable natural materials comprising flour from edible gramineous plants, crushed gramineous hay, a minor proportion of preserving agents, and a plasticizing agent for providing a starting moldable dough suitable for being molded into the shaped fast food package.

9 Claims, No Drawings

BIODEGRADABLE PACKAGES FOR FAST FOOD AND METHOD OF PREPARING THE SAME

This is a continuation of application Ser. No. 07/670,558 filed Mar. 18, 1991 now abandoned.

FIELD OF THE INVENTION

The present invention refers to the art of manufacturing packages for fast food, for use in the food industry and, more particularly, it is related to a composition of matter for the manufacture of a biodegradable package for fast food, which is essentially prepared from natural biodegradable materials.

BACKGROUND OF THE INVENTION

It is well known that the common materials used for the manufacture of packages or vessels for fast food and the like, have essentially consisted of cardboard and polystyrene, which due to their physical characteristics, have maintained a great acceptance throughout the world, inasmuch as said materials may be transported and stored in large amounts and occupy relatively small spaces, and also because they may be easily handled by any person. However, due to the present ecological problems, a great proportion of the expandable polystyrene packages which are widely used in the food industry, and which are non-biodegradable, have been replaced with cardboard or paper packages which, by being manufactured from wood, clearly affect the inventory of trees in the forests of the planet, whereby the impact on the paper industry effected by a change of polystyrene packages into paper packages, will imply a considerable increase in the production of paper at the international level, thereby bringing about an important decrease in the natural resources throughout the world, which are vital for preserving the ecological systems.

Consequently, for long it has been sought to avoid the inconveniences of these materials, by providing a composition which may comply with the same purposes and also with the purposes of being economical and, most of all, biodegradable. The workers in the art, however, have not accomplished any noticeable success in this respect.

OBJECTS OF THE INVENTION

Having in mind the defects of the prior art packages for fast food and in order to overcome the same in a suitable manner, it is an object of the present invention to provide a composition for the manufacture of packages for fast food, which will exclusively imply the use of biodegradable natural materials.

It is another object to the present invention to provide a composition of the above described character, which besides being easily biodegradable, will also be useable as a forage for different types of animals such as beef, pork, sheep.

One other object of the present invention is to provide a composition for the manufacture of packages for fast food, which will be highly economical and will not require costly equipment and processes for the manufacture thereof.

Still one other object of the present invention is to provide a composition for the manufacture of packages for fast food, which, due to the characteristics of its components, will permit the molding of a package that will maintain its shape, dimensions and consistency, as is required for the handling of fast foods.

The foregoing objects and others ancillary thereto, are preferably accomplished as follows:

According to a preferred embodiment of the present invention, a biodegradable composition for the manufacture of packages for fast food is provided, which essentially comprises natural materials derived from gramineous plants, hay and, more particularly, which comprises crushed plasticizing hay accompanied by edible gramineous meal or flour and a minor proportion of the necessary additives such as preservers and plasticizing agents, with the important advantage that the packages manufactured from this composition, after having complied with its objective of providing a package, and when they are discarded, are susceptible to be easily biodegraded, or may serve as a forage for cattle as a final destination thereof.

The novel features that are considered characteristic of the present invention are set forth with particularity in the appended claims. The invention itself, however, both as to its organization and its method of operation, together with additional objects and advantages thereof, will best be understood from the following description of certain specific embodiments thereof, which are given for illustrative but nonlimitative purposes.

DETAILED DESCRIPTION

The composition for the manufacture of packages for fast food in accordance with the present invention, essentially comprises crushed hay of gramineous plants of the type generally used as fodder or forage, and is selected from, for instance, and without being limited to, wheat, sorghum, corn, and corncob leaves, in an amount of from about 2% to about 94% by weight of the total composition; a binding material selected from meals or flours of edible gramineous plants selected, for instance, but not being limited thereto, from corn, wheat, sorghum and in general any other type of edible gramineous plants, the percentages of the gramineous plants flour being of between about 6% and about 98% by weight of the total composition; preservers that are used to protect the package against the environmental conditions, and preferably selected, but without being limited thereto, from preservers such as sodium benzoate, mono-sodium glutamate and any other preserving agent of those normally used in the food industry, the percentage of said preservers being of between about 0.02% and about 1.0% by weight of the total composition; and a plasticizing agent, which is preferably water in an amount sufficient to provide a dough.

The method of making the biodegradable composition for the packaging of fast food, in accordance with the present invention, comprises the steps of forming a dough from an edible gramineous meal selected from, but not being limited to, corn flour, wheat flour, sorghum flour or any other flour derived from edible gramineous plants, the percentages of the gramineous flour or meal being comprised between 6% and 98% by weight of the composition, by cooking or heating the gramineous plant to a temperature of from about 20° and about 300° C. and thereafter milling the cooked gramineous plants in the presence of water as a plasticizing agent; the thus obtained dough is then admixed with suitable amounts of crushed hay of gramineous plants selected from, but not being limited to, wheat, sorghum, corn, corncob leaves, and in general of any edible gramineous plant and is stirred until a homogeneous composition is obtained, the proportion of said hay in relation to the dough being in the order of from about 2 to about 94% by weight and, finally, a minor proportion, of the order of from about 0.02 to about 1.0% by weight, of suitable preserving agents for preventing a premature decomposition is added to the mixture.

In another aspect, the present invention comprises a method for the manufacture of a package from the above described biodegradable composition, which comprises molding the composition, upon achieving a homogeneous consistency thereof, by filling with said composition, admixed with water, a metal mold having a shape suitable for forming the desired package, for instance, a box or the like, said mold being built such that it may be able to support heating to temperatures which vary from about 50° to about 380° C. Said mold comprises two parts that provide an inner space for regulating the thickness of the package, which preferably is in the order of from about 1 to about 10 mm.

The method is preferably carried out by pouring said mixture with a moisture content of about 50% into the mold, until the hollow space thereof is totally filled, closing said mold under pressure for subjecting the mixture to suitable pressure for compacting the material, then heating said filled mold to the above defined temperature, using for this purpose either electrical energy, steam, oil heating or any other heating means, until the moisture content of the material is reduced to about 0.01%, and opening the mold after having achieved said conditions, to thereafter remove the thus formed package, which is allowed to cool in the air to room temperature. In order to avoid undue deformation of the packages during the cooling step, it has been found preferable to pile said packages over each other, such that during the cooling thereof they will support each other under a moderate pressure so that no deformation will occur in the individual packages. The packages which are obtained by means of the above described method, show a weight variation of from about 3 to about 30 grams per individual package, which may be regarded as falling within the standards of the food industry.

In accordance with the above, it may be seen that for the first time a composition of matter for the manufacture of packages for fast food has been provided, that is capable of effecting a double function, inasmuch as the characteristics of its components permit, on the one hand, to easily mold the package for fast food in accordance with the needs of the product and of the consumers and, on the other hand, said composition is absolutely and easily biodegradable, or alternatively it may be used, after discarded, as a forage for different types of cattle, thus bringing about in both instances, the great advantage of not contaminating the environment as is the case of those materials which are non-biodegradable nor reusable.

Finally, taking into consideration the type of starting materials used for the manufacture of the packages in accordance with the present invention, and also taking into consideration the simplicity of the equipment used for the manufacture thereof, it is to be concluded that the product will have a high competitiveness in the market.

Although certain specific embodiments of the present invention have been shown and described above, it is to be understood that many modifications thereof are possible. The present invention, therefore, is not to be restricted except insofar as is necessitated by the prior art and by the spirit of the appended claims:

What is claimed is:

1. A biodegradable package for fast food which comprises a heat-molded body of a moldable composition which consists essentially of an admixture of flour from edible gramineous plants, crushed gramineous hay, a minor proportion of preserving agents, and a plasticizing agent for providing a starting moldable dough said body having a thickness from about 1 mm to about 10 mm.

2. A biodegradable package for fast food according to claim 1, wherein said moldable composition consists of from about 6% to about 98% by weight of said flour from edible gramineous plants, from about 2% to about 94% by weight of said crushed gramineous hay, from about 0.02% to about 1.0% by weight of said preserving agents; and an amount of said plasticizing agent sufficient to provide a starting moldable dough.

3. A biodegradable package for fast food according to claim 1, wherein said flour from edible gramineous plants is selected from corn flour, wheat flour and sorghum flour.

4. A biodegradable package for fast food according to claim 1, wherein said crushed gramineous hay is selected from corn hay, wheat hay, sorghum hay and corncob leaves.

5. A biodegradable package for fast food according to claim 4, wherein said crushed gramineous hay comprises crushed corncob leaves.

6. A biodegradable package for fast food according to claim 1, wherein said plasticizing agent is water.

7. A biodegradable package for fast food according to claim 1, wherein said preserving agent is selected from the group comprising sodium benzoate and monosodium glutamate.

8. A method for the manufacture of a biodegradable package for fast food which comprises the steps of:
  a) heating pieces of a gramineous plant to a temperature of from about 20° to about 300° C. for cooking the same;
  b) milling the cooked gramineous plant pieces in the presence of water as a plasticizing agent in order to form a dough of a flour of said milled gramineous plant;
  c) admixing said dough with suitable amounts of crushed hay of gramineous plants and stirring the mixture until a homogeneous dispersion is obtained;
  d) adding a minor proportion of preserving agents for preventing a premature decomposition of the dough;
  e) pouring said dough in a mold and heating to a temperature of from about 50° to 350° C., until the moisture content of said dough is reduced to provide a self-sustaining shaped package for fast food.

9. A method according to claim 8 wherein said dough is fed into the mold with a moisture content of about 50% and the mold is heated until the moisture content of the composition is reduced to about 0.01%.

* * * * *